(12) United States Patent
Wilson et al.

(10) Patent No.: US 10,857,600 B2
(45) Date of Patent: Dec. 8, 2020

(54) REPLICATED HOLE PATTERN FOR REMOTELY LOCATED STRUCTURAL COMPONENTS

(71) Applicant: The Boeing Company, Chicago, IL (US)

(72) Inventors: Jake Aspen Wilson, Charleston, SC (US); James A. Aske, Hanahan, SC (US); Mark Edward Nestleroad, Charleston, SC (US); Andrew John Ponton, Summerville, SC (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 16/145,693

(22) Filed: Sep. 28, 2018

(65) Prior Publication Data

US 2020/0101541 A1 Apr. 2, 2020

(51) Int. Cl.
| | |
|---|---|
| *B23Q 35/12* | (2006.01) |
| *B23B 39/26* | (2006.01) |
| *B23B 47/28* | (2006.01) |
| *G05B 19/19* | (2006.01) |
| *B23B 49/02* | (2006.01) |

(52) U.S. Cl.
CPC ............ *B23B 47/287* (2013.01); *B23B 39/26* (2013.01); *B23Q 35/12* (2013.01); *B23B 49/02* (2013.01); *B23B 2215/04* (2013.01); *B23B 2247/12* (2013.01); *G05B 19/19* (2013.01)

(58) Field of Classification Search
CPC ..... B23B 39/26; B23B 39/14; B23B 2270/34; B23B 35/00; B23B 2215/04; B23B 2247/04; B23Q 33/00; B23Q 35/02; B23Q 35/42; Y10T 408/888; Y10T 408/03; Y10T 408/08; Y10T 408/5612; Y10T 408/6764;

(Continued)

(56) References Cited

U.S. PATENT DOCUMENTS

| | | | | |
|---|---|---|---|---|
| 2,213,959 A | * | 9/1940 | Garrison ................ | B23Q 35/32 409/98 |
| 2,955,490 A | * | 10/1960 | Hess ...................... | B23Q 35/02 408/3 |

(Continued)

FOREIGN PATENT DOCUMENTS

| | | | | |
|---|---|---|---|---|
| DE | 2418863 A1 | * | 10/1975 | ............. H05K 13/04 |
| FR | 2555083 A1 | * | 5/1985 | ............ B23P 19/006 |

*Primary Examiner* — Nicole N Ramos
(74) *Attorney, Agent, or Firm* — Duft & Bornsen, PC

(57) ABSTRACT

Embodiments herein provide drill hole location transfer between remote components. One embodiment is an apparatus for replicating drill holes of a first workpiece on a second workpiece remotely located from the first workpiece. The apparatus includes an interface to receive coordinate data of first alignment pins installed to first template holes of a first drill plate, and a receptacle to receive a second drill plate having second template holes that match a pattern of the first templates holes of the first drill plate. A pin setting device moves a reference member in a plane over the receptacle, and positions the reference member with respect to the second drill plate based on the coordinate data of the first alignment pins, thus indicating locations within the second template holes to position drill bushings for replicating the first holes of the first workpiece on the second workpiece.

20 Claims, 5 Drawing Sheets

(58) Field of Classification Search
CPC .................. Y10T 408/567; Y10T 408/553; Y10T 408/93
See application file for complete search history.

(56) References Cited

U.S. PATENT DOCUMENTS

| | | | | |
|---|---|---|---|---|
| 3,238,624 | A * | 3/1966 | McCabe | B23B 35/005 33/23.03 |
| 3,518,918 | A * | 7/1970 | Keown | B23Q 16/005 91/47 |
| 4,268,949 | A * | 5/1981 | Sato | B23Q 3/15713 408/6 |
| 4,332,066 | A * | 6/1982 | Hailey | B23B 31/08 29/26 R |
| 4,603,285 | A * | 7/1986 | Matsuura | B23Q 35/123 318/571 |
| 4,639,172 | A * | 1/1987 | Kishi | B23Q 35/123 318/570 |
| 5,003,484 | A * | 3/1991 | Vollmayr | G05B 19/4207 409/99 |
| 5,497,336 | A * | 3/1996 | Andersson | A61C 13/0004 700/161 |
| 5,560,408 | A * | 10/1996 | DiFranco | B23B 47/287 144/104 |
| 2015/0056031 | A1* | 2/2015 | Gehlsen | B23B 39/14 408/1 R |
| 2017/0106452 | A1* | 4/2017 | Andersson | B23B 49/00 |
| 2018/0043440 | A1 | 2/2018 | Nestleroad et al. | |

* cited by examiner

REPLICATED HOLE PATTERN FOR REMOTELY LOCATED STRUCTURAL COMPONENTS

FIELD

This disclosure relates to drilling and assembly of structures, and more particularly, to hole pattern duplication for assembling structures, such as aircraft parts.

BACKGROUND

In aircraft assembly, two structural components can be assembled together using using a drill plate to match drill the components. The drill plate defines a hole pattern for drilling the two components with holes that precisely align and match so that a fastener can be inserted through the holes to assemble the components together. However, to transfer the hole pattern with high levels of precision, current match drilling techniques require the drill plate to be physically moved between parts for hole pattern transfer, thus making it necessary for drill operations to be performed at a single assembly site.

SUMMARY

Embodiments described herein include systems and methods for transferring drill hole locations between remote components. A first adaptive drill plate captures high tolerance hole patterns of a first object using pins. The pin locations are transferred digitally to another location that uses a pin setting device that replicates the pattern of pins on a second adaptive drill plate. Using the precise pin locations on the second adaptive drill plate as a guide, new holes can be drilled in a second object that duplicate the holes of the first object with very high accuracy even though the objects are not co-located. Advantageously, hole patterns may be transferred with high precision for parts manufactured at separate facilities or worksites without the expense of advanced scanning technology or heavy machining.

One embodiment is an apparatus for replicating drill holes of a first workpiece on a second workpiece remotely located from the first workpiece. The apparatus includes an interface configured to receive coordinate data of first alignment pins installed to first template holes of a first drill plate, the first alignment pins configured to adaptively align the first template holes of the first drill plate with first holes of the first workpiece. The apparatus also includes a receptacle configured to receive a second drill plate having second template holes that match a pattern of the first templates holes of the first drill plate. The apparatus further includes a pin setting device configured to move a reference member in a plane over the receptacle including the second drill plate, and to position the reference member with respect to the second drill plate based on the coordinate data of the first alignment pins. When the reference member positions to coordinates in the coordinate data, the reference member indicates locations within the second template holes of the second drill plate to position drill bushings for replicating the first holes of the first workpiece on the second workpiece.

Another embodiment is a method of replicating drill holes of a first workpiece on a second workpiece remotely located from the first workpiece. The method includes positioning a first drill plate, including first drill bushings and first alignment pins installed to first template holes of the first drill plate, with respect to a first pin setting device, wherein the first drill bushings and first alignment pins align in the first template holes to correspond with first holes in the first workpiece. The method also includes operating the first pin setting device to position a first reference member in a plane over the first drill plate to first positions that align with centers of the first alignment pins, capturing coordinate data of the first positions, and providing the coordinate data of the first positions to a second pin setting device. The method further includes positioning a second drill plate with respect to the second pin setting device, the second drill plate including second template holes that match the first template holes of the first drill plate. The method also includes operating the second pin setting device to position a second reference member in a plane over the second drill plate to second positions according to the coordinate data, positioning second drill bushings in the second template holes of the second drill plate based on the second positions of the second reference member, and positioning the second drill plate, including the second drill bushings installed to the second template holes, on the second workpiece. The method further includes drilling holes in the second workpiece using the second drill bushings to guide the drilling to replicate the first holes in the first workpiece as second holes in the second workpiece.

Yet another embodiment is a system for replicating drill holes of a first workpiece on a second workpiece remotely located from the first workpiece. The system includes a first drill plate including first drill bushings installed to first template holes of the first drill plate, the first drill bushings configured to receive first alignment pins sized to extend through the first drill bushings and into first holes of a first workpiece to align the first drill bushings within the first template holes. The system also includes a first pin setting device including: a first receptacle configured to receive the first drill plate including the first drill bushings and the first alignment pins, and a first positioning system configured to translate a first ring in a plane over the first receptacle, to move the first ring to first positions that align with centers of the first alignment pins, and to capture coordinate data of the first alignment pins based on the first positions of the first ring. The system further includes a second drill plate including second template holes that match with the first template holes of the first drill plate, and a second pin setting device including: a second receptacle configured to receive the second drill plate, and a second positioning system configured to receive the coordinate data of the first alignment pins, to translate a second ring in a plane over the second receptacle, and to move the second ring to second positions according to the coordinate data, the second positions indicating locations of positioning second drill bushings in the second template holes of the second drill plate.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
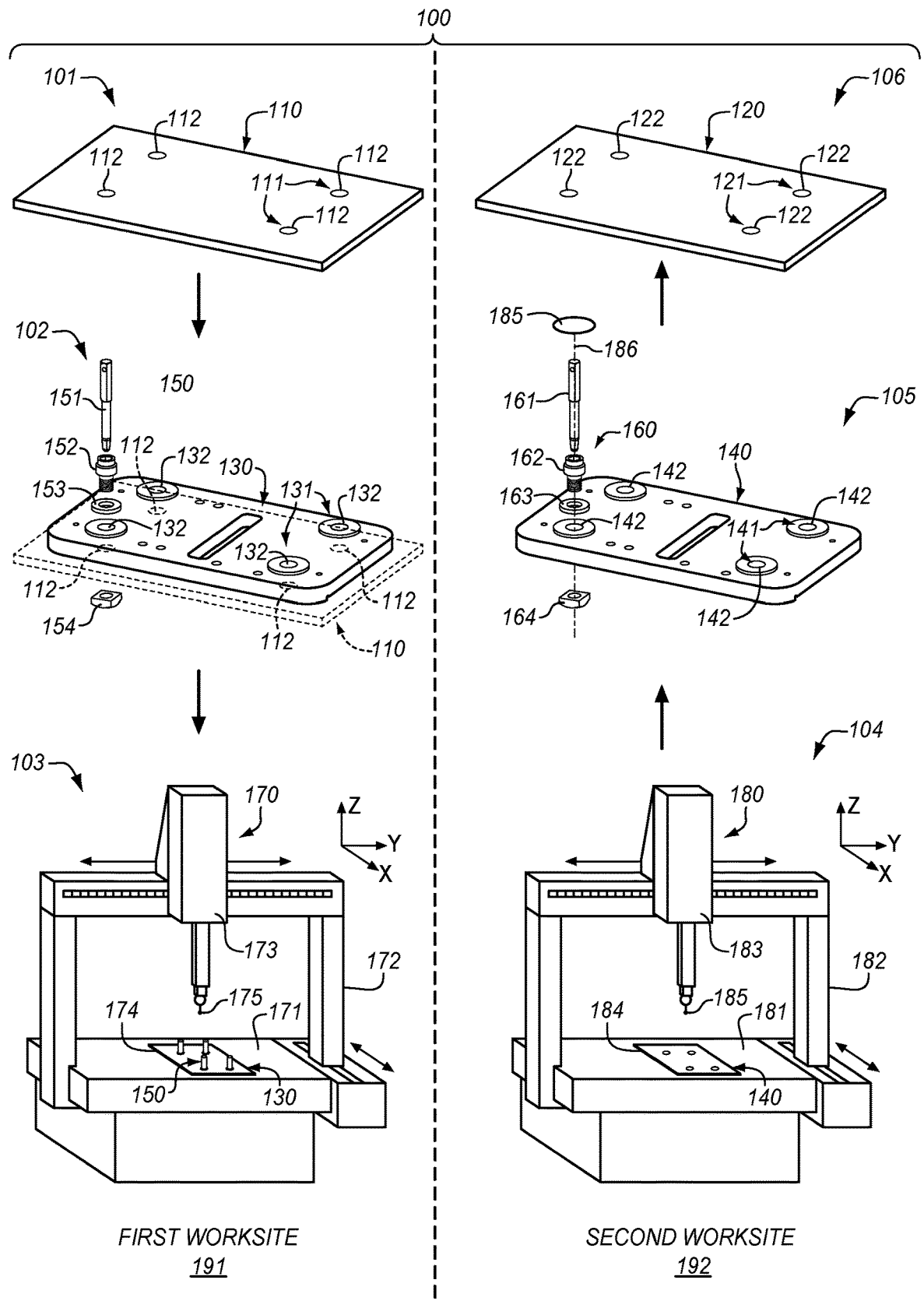
FIG. 1 is a flow diagram of replicating drill holes of a first workpiece on a second workpiece remotely located from the first workpiece in an illustrative embodiment.

FIG. 1 is a flow diagram 100 of replicating drill holes of a first workpiece on a second workpiece remotely located from the first workpiece in an illustrative embodiment. Suppose, for example, that it is desirable to assemble together a first workpiece 110 (shown in step 101) and a second workpiece 120 (shown in step 106). The workpieces 110/120 may each comprise a component of an aircraft, or any other type of object. The first workpiece 110 includes a pattern 111 of drill holes 112. Accordingly, to assemble the first workpiece 110 and the second workpiece 120 together, the second workpiece 120 is to be drilled to include a pattern 121 of drill holes 122 to match and align with the pattern 111 of drill holes 112 in the first workpiece 110. This enables assembly of the workpieces 110/120 by aligning the matching patterns 111/121 of drill holes 112/122, and inserting fasteners through the drill holes 112/122 to secure the workpieces 110/120 together.

In previous match drilling techniques, two workpieces are match drilled by placing a drill plate on a first workpiece to drill holes in the first workpiece, and physically transferring the drill plate to the second workpiece to drill the same pattern of holes in the second workpiece. However, this means that the two workpieces and the drill plate are to be co-located at the same worksite (e.g., manufacturing facility). Additionally, existing techniques for hole pattern transfer involving advanced scanning technology are prohibitively expensive and/or insufficiently accurate for high tolerance manufacturing applications such as aircraft assembly.

The flow diagram 100 including steps 101-106 enables precise hole pattern transfer for remotely located workpieces. In step 101, the first workpiece 110 is provided at a first worksite 191. As mentioned above, the first workpiece 110 generally includes the pattern 111 of drill holes 112. Any number of known drilling tools and techniques may be used to create the pattern 111 of drill holes 112 in the first workpiece 110. As described in greater detail below, the techniques and components of additional steps 102-106 facilitate duplication of the pattern 111 of drill holes 112 in the first workpiece 110 located at the first worksite 191 on a second workpiece 120 located at a second worksite 192 (which is remote from the first worksite 191) with relatively low-cost equipment and at high precision. Generally, as shown in FIG. 1, steps 101-103 are performed at the first worksite 191, and steps 104-106 are performed at the second worksite 192.

In step 102, a first drill plate 130 engages the first workpiece 110. The first drill plate 130 includes a pattern 131 of template holes 132 that match/align with the pattern 111 of drill holes 112 in the first workpiece 110. In some embodiments, the first drill plate 130 is placed on the first workpiece 110 to produce the pattern 111 of drill holes 112 using the pattern 131 of template holes 132 as a drill bit guide. Alternatively, the first drill plate 130 may be manufactured (e.g., 3D printed) with the pattern 131 of template holes 132 to match with the pattern 111 of drill holes 112 already existing in the first workpiece 110. Although the patterns 111/131 of the holes 112/132 generally match, the template holes 132 may be sized slightly larger than the drill holes 112 to allow uninterrupted passage of a drill bit through a template hole 132 and also to allow for drill plate variation as described in further detail below.

Additionally, in step 102, one or more first alignment assemblies 150 adaptively align the first drill plate 130 with the first workpiece 110. The first alignment assembly 150 includes an alignment pin 151, a drill bushing 152, a floating bushing 153, and a locking nut 154. Generally, the alignment pin 151 is inserted through the template hole 132 and into the drill hole 112 to precisely align the drill bushing 152, the template hole 132, and the drill hole 112. The first alignment assembly 150 is then tightened to temporarily secure the drill bushing 152 in place with respect to the template hole 132.

Therefore, with the first alignment assembly 150 installed to the template hole 132, the drill bushing 152 is situated in a secured position within template hole 132 to guide a drill bit accurately into the drill hole 112, even if the alignment of the template hole 132 and the drill hole 112 is not exact (e.g., slightly off-centered). The first alignment assembly 150 thus adaptively aligns the template hole 132 and the drill hole 112. Though just one of the first alignment assemblies 150 is shown in step 102 for ease of illustration, multiple first alignment assemblies 150 may be installed to corresponding template holes 132 for adaptive alignment with corresponding drill holes 112. Thus, with the first alignment assemblies 150 secured to the template holes 132, the first drill plate 130 is adaptively aligned with the first workpiece 110.

In step 103, the first drill plate 130, including the alignment assemblies 150 installed to the template holes 132, is positioned on a first pin setting device 170. That is, after securing the alignment assemblies 150 in their adaptively aligned positions within the template holes 132, the first drill plate 130 may be disengaged from the first workpiece 110 and placed on the first pin setting device 170. The first pin setting device 170 includes a table 171 to support the first drill plate 130, and one or more support members 172-173 each moveable in an orthogonal axis (e.g., X-axis, and Y-axis, respectively). The first pin setting device 170 also includes a reference member 175 that is directly or indirectly attached to the support members 171-172 to move the reference member 175 in a plane (e.g., X-Y plane) over the table 171 with respect to a reference point 174.

The first pin setting device 170 is configured to track/provide coordinate data (e.g., one or more X-Y coordinate pair values) of the position of the reference member 175 with respect to the reference point 174. Therefore, the first drill plate 130 may be positioned/secured to the table 171 with respect to the reference point 174 such that the coordinate data of the reference member 175 desirably reflects a corresponding location of the first drill plate 130.

Accordingly, in step 103, the first pin setting device 170 may be operated to move the reference member 175 to align with an alignment assembly 150, and to capture a coordinate pair value (e.g., an X-coordinate value and Y-coordinate value) of the alignment assembly 150. The first pin setting device 170 may record a coordinate value in response to aligning/centering the reference member 175 above the alignment assembly 150. The reference member 175 generally maneuvers to multiple alignment positions to capture a two-dimensional coordinate value for each of the multiple first alignment assemblies 150 installed in the first drill plate 130. Thus, the coordinate data captured by the first pin setting device 170 defines an installed position of the alignment assemblies 150 with respect to the first drill plate 130 and the reference point 174.

In step 104, the coordinate data captured by the first pin setting device 170 is provided to a second pin setting device 180 at the second worksite 192. Additionally, a second drill plate 140 is positioned on the second pin setting device 180. The second pin setting device 180 and the second drill plate 140 are similarly configured as the first pin setting device 170 and the first drill plate 130, respectively. Thus, the second pin setting device 180 includes a table 181 to support the second drill plate 140 and one or more support members 182-183 each configured to move along an orthogonal axis (e.g., X-axis, and Y-axis, respectively). The second pin setting device 180 also includes a reference member 185 that is directly or indirectly attached to the support members 181-182 to move the reference member 185 in a plane (e.g., X-Y plane) over the table 181 with respect to a reference point 184.

The second pin setting device 180 is configured to position the reference member 185 with respect to the reference point 184 according to the received coordinate data. Therefore, the second drill plate 140 may be positioned/secured to the table 181 with respect to the reference point 184 at a location/orientation that replicates the location/orientation of the first drill plate 130 and the reference point 174 in step 103. This enables the second pin setting device 180 to apply the coordinate data in positioning the reference member 185 relative to the second drill plate 140 to replicate the positioning of the reference member 175 relative to the first drill plate 130 as described in step 103.

In step 105, the reference member 185 is positioned over the second drill plate 140 based on the coordinate data of the alignment assemblies 150 installed to the first drill plate 130. As previously mentioned, the second drill plate 140 is similarly positioned with respect to the reference point 184 of the second pin setting device 180 (in step 104) as the first drill plate 130 positioned with the reference point 174 of the first pin setting device 170 (in step 103). Additionally, the second drill plate 140 is similarly configured with the first drill plate 130, including a pattern 141 of template holes 142 generally matching the pattern 131 of template holes 132 of the first drill plate 130, though relatively small manufacturing variations may exist among the drill plates 130/140. For example, the drill plates 130/140 may be 3D printed using the same design specifications but with different machinery and/or at different worksites 191/192, potentially resulting in template holes 142 being located in the second drill plate 140 at slightly different locations than the templates holes 132 in the first drill plate 130.

The reference member 185 positions to a coordinate value in the plane (e.g., X-Y plane) over the second drill plate 140 to provide an alignment reference 186 for installing a second alignment assembly 160 to the second drill plate 140. The alignment reference 186 may define a line extending vertically from and coaxially with the reference member 185 along an axis (e.g., Z-axis) perpendicular to the plane to facilitate installation of the second alignment assembly 160 to an accurate lateral position (e.g., X-Y location) in the template hole 142. Though just one of the second alignment assemblies 160 is shown in step 105 for ease of illustration, the reference member 185 may maneuver to multiple alignment positions (e.g., each of the coordinate value pairs in the coordinate data) for installing multiple second alignment assemblies 160 to corresponding template holes 142 of the second drill plate 140.

The second alignment assemblies 160 may be similarly configured as the first alignment assemblies 150, with each second alignment assembly 160 including an alignment pin 161, a drill bushing 162, a floating bushing 163, and a locking nut 164. Additionally, the second alignment assembly 160 is configured to temporarily secure to the second drill plate 140 such that the alignment pin 161 and drill bushing 162 may lock in place with respect to the template hole 142.

Thus, the second alignment assembly 160 may be accurately installed to the second drill plate 140 by aligning the alignment pin 161 with the alignment reference 186, and securing the drill bushing 162 to a lateral position with respect to the template hole 142 as defined by the aligning position of the alignment pin 161. This enables the drill bushing 162 to be installed in position with respect to the template hole 142 of the second drill plate 140 to precisely replicate the position of the drill bushing 152 adaptively installed to the template holes 132 of the first drill plate 130. As such, even if there are slight physical differences between the drill plates 130/140 (e.g., corresponding template holes 132/142 have slightly offset locations due to production variability of the drill plates 130/140), locations of corresponding drill bushing 152/162 may be replicated with high precision.

In step 106, the second drill plate 140, including the drill bushings 162 installed to the template holes 142, is positioned on the second workpiece 120 for drilling the pattern 121 of drill holes 122 in the second workpiece 120. Since the drill bushings 162 are accurately installed in corresponding template holes 142 according to precise lateral coordinate positions, the drill bushings 162 are able to precisely guide a drill bit through the template holes 142 to produce the pattern 121 of drill holes 122 in the second workpiece 120 that replicates the pattern 111 of drill holes 112 in the first workpiece 110 with high levels of precision. The second drill plate 140 and the second alignment assemblies 160 installed thereto are not shown in step 106 for illustration purposes.

Thus, the flow diagram 100 enables high tolerance hole pattern transfer from the first workpiece 110 located at the first worksite 191 to the second workpiece 120 located at a second worksite 192. Advantageously, the workpieces 110/120 may be manufactured by different suppliers and/or at different geographical locations, yet still be produced with precisely matching hole patterns to meet strict tolerance demands for assembling aircraft parts. Moreover, the hole pattern is duplicated without either workpiece 110/120 being present or in contact with another and without physically transferring or shipping a drill plate between the workpieces 110/120.

Figure 2:
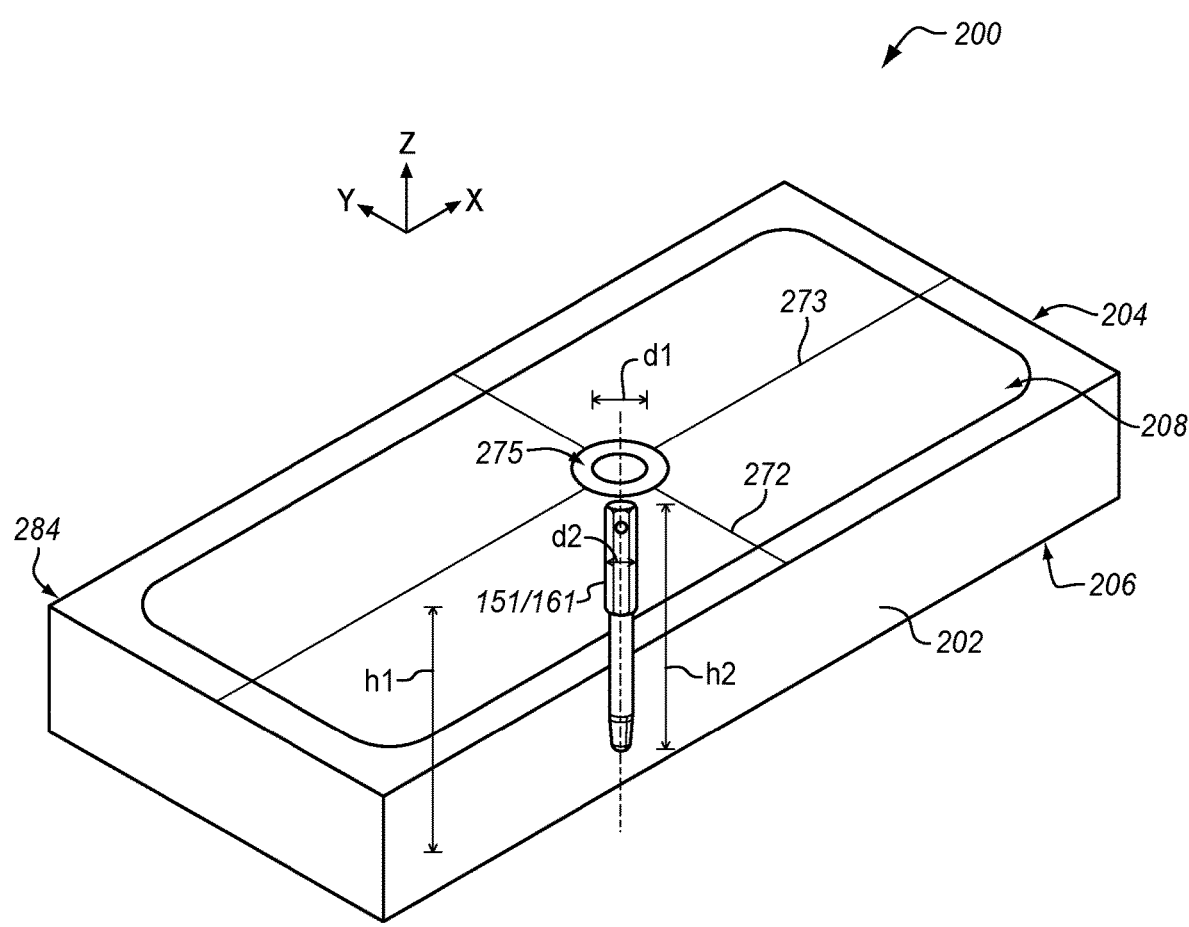
FIG. 2 is a perspective view of a pin setting device in an illustrative embodiment.

FIG. 2 is a perspective view of a pin setting device 200 in an illustrative embodiment. Generally, the pin setting device 200 (e.g., the first pin setting device 170 and/or the second pin setting device 180) includes a body 202 having a top surface 204 and a bottom surface 206. The body 202 (e.g., box-shaped body) includes a receptacle 208 to receive/secure the first drill plate 130 and/or the second drill plate 140 (not shown in FIG. 2 for ease of illustration). The receptacle 208 is generally a hollow/indented space in the top surface 204 that is sized to correspond with the drill plates 130/140. In other words, a drill plate 130/140 may be placed in the pin setting device 200 to rest at the bottom of the receptacle 208 such that an installed alignment pin 151/161 orients and extends upward (e.g., along Z-axis) toward the top surface 204 and such that unintended lateral movement (e.g., in the X-Y directions) of the drill plate 130/140 is restricted by walls of the receptacle 208.

Similar to that already described above with respect to the pin setting devices 170/180, the pin setting device 200 is configured to maneuver a reference member in the plane with respect to a reference point 284 of a coordinate system. In this embodiment, the pin setting device 200 includes a reference ring 275 attached to support members 272-273 that suspend and move the reference ring 275 in a plane (e.g., X-Y plane) over the receptacle 208 that secures the drill plate 130/140. Accordingly, the pin setting device 200 may accurately correlate coordinate data with a location of the alignment pin 151/161 by centering the reference ring 275 over the alignment pin 151/161.

The reference ring 275 may include an O-ring having an inner diameter d1 that corresponds or matches with an upper dimension d2 of the alignment pin 151/161. Alternatively or additionally, the suspended height h1 of the reference ring 275 may correspond with a pin height h2 of the alignment pin 151/161 such that the reference ring 275 translates in a lateral plane slightly above the alignment pin 151/161. For instance, the receptacle 208 may be configured with a depth or wall height such that the suspended height h1 of the reference ring 275 in the plane of the top surface 204 is proximate with the top of an installed alignment pin 151/161. Thus, a human operator or sensor may advantageously detect an aligned/centered position of the reference ring 275 and the alignment pin 151/161 (indicated by the dashed line in FIG. 2) easily and with high precision, thereby capturing/transferring coordinate data with high precision.

Figure 3:
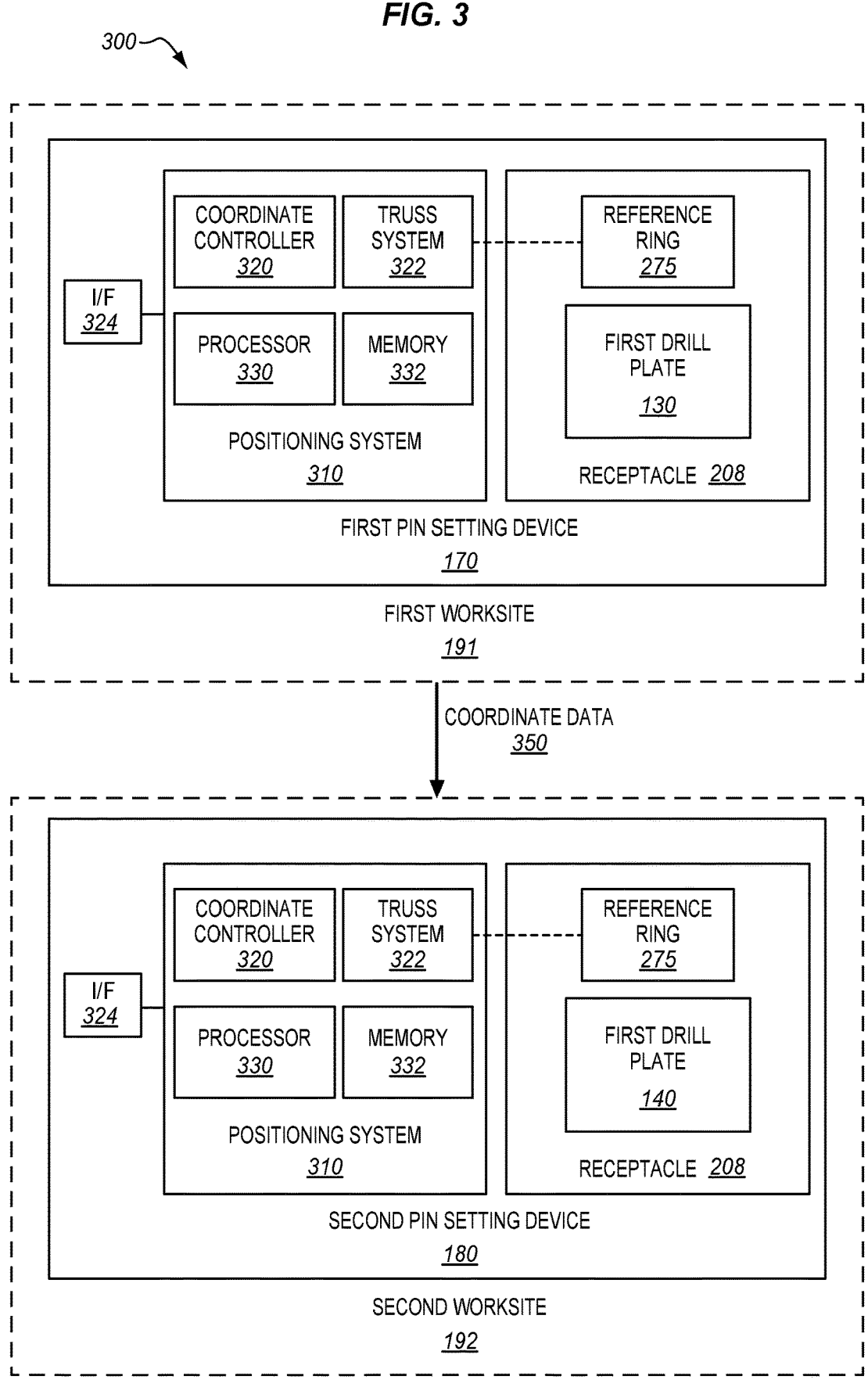
FIG. 3 is a block diagram of a first pin setting device and second pin setting device in an illustrative embodiment.

Similar or identical versions of the pin setting device 200 may be provided at the different worksites 191/192. FIG. 3 is a block diagram 300 of the first pin setting device 170 and the second pin setting device 180 in an illustrative embodiment. As shown in this example, the first pin setting device 170 operates with respect to the first drill plate 130 in its receptacle 208 at a first worksite 191, and the second pin setting device 180 operates with respect to the second drill plate 140 in its receptacle 208 at a second worksite 192. The pin setting devices 170/180 also include respective reference rings 275, positioning systems 310, and interfaces 324.

In general, the positioning system 310 is configured to track the position of the reference ring 275 with coordinate data, which is any data that describes the position of a marker in a coordinate system. For example, the coordinate data may describe the x, y, z position of the reference ring 275 in a Cartesian coordinate system with respect to a reference point (e.g., reference point(s) 174, 184, and/or 284). The positioning system 310 includes a coordinate controller 320 and a truss system 322. The truss system 322 may include one or more linear drive mechanisms, one or more linear guides, one or more linear measuring instruments, and/or one or more bridges (e.g., support members 172-173 and/or 182-183) to position the reference ring 275 according to coordinate data. The truss system 322 may be driven according to manual input of a human operator or via coordinate data provided by the coordinate controller 320.

The coordinate controller 320 is configured to determine the spatial coordinate position of the reference ring 275 as a function of the truss system 322 and the reference point of the pin setting device 170/180. Accordingly, settings related to the truss system 322 and/or reference point may be stored in memory 332 to ensure corresponding relative positioning of the pin setting devices 170/180 with respective elements. For example, the reference point may define a position/orientation of the receptacle 208 with respect to the table 171/181, and/or a position/orientation of the drill plate 130/140 with respect to the receptacle 208. The coordinate controller 320 is thus able to process/track coordinate data of the reference ring 275 relative to positions of alignment assemblies 150/160 in the drill plates 130/140.

The coordinate controller 320 may comprise hardware, software, or a combination of hardware and software. For example, coordinate controller 320 may include a processor 330, which includes any electronic circuits and/or optical circuits that are able to perform functions. The processor 330 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. The coordinate controller 320 may also include memory 332, which may include any electronic circuits, optical circuits, and/or magnetic circuits that are able to store data. The first pin setting device 170/180 may also include an interface 324 to exchange coordinate data over one or more wired or wireless connections.

In operating the first pin setting device 170 with respect to the first drill plate 130, the pattern 111 of holes 112 in the first workpiece 110 is accurately captured with coordinate data by recording a coordinate pair value of the reference ring 275 as the reference ring 275 aligns/centers with an alignment pin 151 of a first alignment assembly 150 installed in the first drill plate 130. The coordinate controller 320 may record a coordinate value in memory 332 in response to operator or sensor input indicating that the reference ring 275 is centered over an alignment assembly 150/160. After the coordinate value of each first alignment assembly 150 is recorded, the coordinate values may be submitted as coordinate data 350 to the second pin setting device 180 via interfaces 324.

In operating the second pin setting device 180 with respect to the second drill plate 140, the pattern 111 of holes 112 in the first workpiece 110 is accurately transferred to the second drill plate 140 by positioning the reference ring 275 with the coordinate data 350 to provide an alignment/centering guide for installing the second alignment assemblies 160 to the second drill plate 140. The second drill plate 140 is thus configured with second alignment assemblies 160 having drill bushings 162 set in place to align a drill bit for drilling the pattern 121 of drill holes 122 in the second workpiece 120 that precisely replicates the pattern 111 of drill holes 112 in the first workpiece 110.

Figure 4:
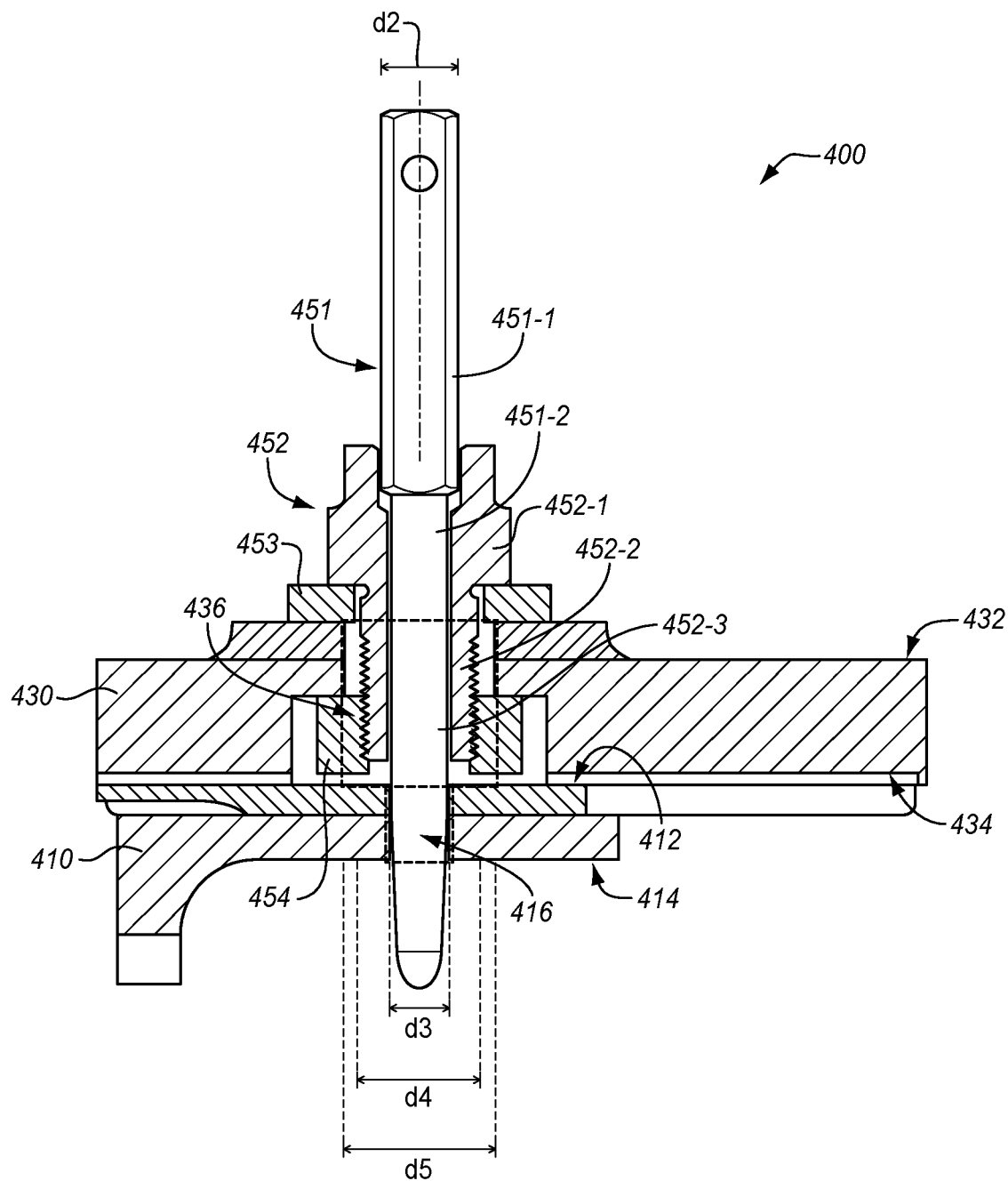
FIG. 4 is a cross-sectional side view of an alignment assembly installed to a drill plate to adaptively align with a workpiece.

FIG. 4 is a cross-sectional side view of an alignment assembly 400 installed to a drill plate 430 to adaptively align with a workpiece 410. The alignment assembly 400, drill plate 430, and workpiece 410 may include the features and functions of alignment assemblies 150/160, drill plates 130/140, and workpieces 110/120 previously described, and thus a detailed description of such is omitted for sake of brevity. Generally, the alignment assembly 400 includes an alignment pin 451, a drill bushing 452, a floating bushing 453, and a locking nut 454. The drill plate 430 includes an upper surface 432, a lower surface 434, and one or more template holes 436 extending through the upper surface 432 and lower surface 434. Similarly, the workpiece 410 includes an upper surface 412, a lower surface 414, and one or more pilot holes 416 extending through the upper surface 412 and lower surface 414.

As shown in FIG. 4, the alignment pin 451 is configured to be inserted through the drill bushing 452 with an end sized to fit the pilot hole 416. The alignment pin 451 includes a top portion 451-1 and a bottom portion 451-2. The drill bushing 452 includes a head portion 452-1, a threaded shank portion 452-2, and a passage 452-3. The passage 452-3 provides a cylindrical aperture that is open at both ends and extends through the head portion 452-1 and threaded shank portion 452-2. The top portion 451-1 of the alignment pin 451 includes a width or dimension d2 as earlier described with respect to FIG. 2, and the bottom portion 451-2 of the alignment pin 451 includes a width or dimension d3 slightly smaller than d2 such that the bottom portion 451-2 slides through the passage of the drill bushing 452 and into the pilot hole 416 of the workpiece 410. That is, the bottom portion 451-2 may be sized with dimension d3 to correspond with the passage 452-3 of the drill bushing 452 (and/or the size of the drill bit used or intended to be used for the workpiece 410) such that an end of the bottom portion 451-2 closely fits with the pilot hole 416. The top portion 451-1 may be sized with dimension d2 to rest in the head portion 452-1 of the drill bushing 452.

Accordingly, with the drill bushing 452 inserted through the template hole 436, and the alignment pin 451 inserted through the drill bushing 452 (and thus also through the template hole 436) and into the pilot hole 416, the alignment pin 451 provides a guide for adaptively positioning the drill bushing 452 laterally within the template hole 436. Thus, although the threaded shank portion 452-2 of the drill bushing 452 includes an outer width or dimension d4 that is smaller than the diameter d5 of the template hole 436, the threaded shank portion 452-2 may be adjustably/adaptively aligned within the template hole 436 for guiding a drill bit precisely the same location as the pilot hole 416. That is, after locking the drill bushing 452 in place with respect to the template hole 436, the drill plate 430 may be transferred to an undrilled workpiece, the alignment pin 451 may be removed from the drill bushing 452, and the drill bushing 452 may be used as a drill bit guide for drilling matching holes.

Figure 5:
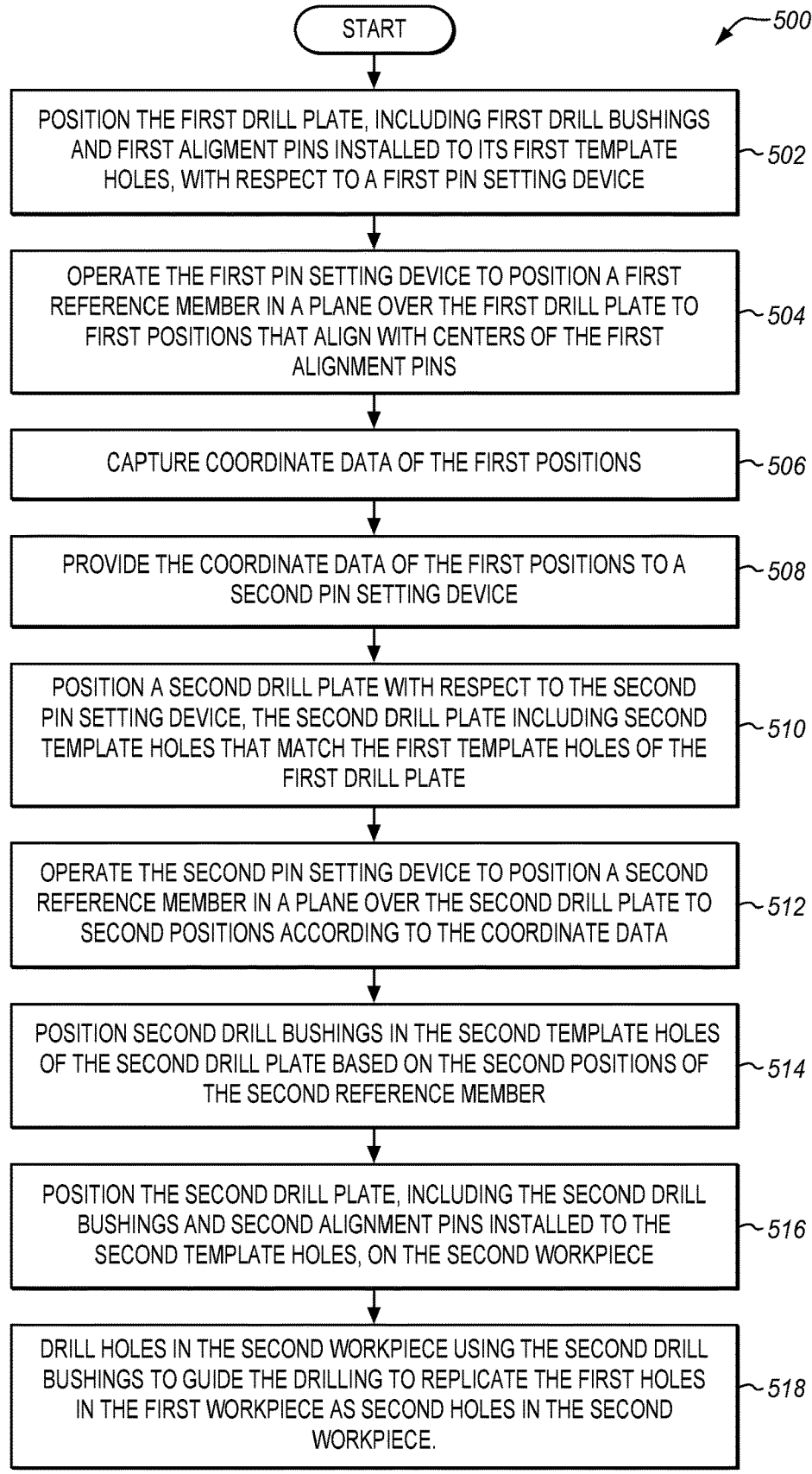
FIG. 5 is a flowchart of a method of replicating drill holes of a first workpiece on a second workpiece remotely located from the first workpiece in an illustrative embodiment.

FIG. 5 is a flowchart of a method 500 of replicating drill holes of a first workpiece on a second workpiece remotely located from the first workpiece in an illustrative embodiment. The steps of the flowchart(s) will be described with reference to FIGS. 1-4, but those skilled in the art will appreciate that the methods may be performed in other systems and devices. The steps of the flowchart(s) described herein are not all inclusive, may include other steps not shown, and may be performed in an alternative order.

Assume, for this embodiment, that the first drill bushings (e.g., drill bushings 152) and the first alignment pins (e.g., alignment pins 151) have been set as the first drill plate 130 laid upon (partially or wholly) the first workpiece 110 with the template holes 436 lined up with holes 112. Further assume that the first workpiece 110, the first drill plate 130, and the first pin setting device 170 are located at a first worksite 191, and the second workpiece 120, the second drill plate 140, and the second pin setting device 180 are located at a second worksite 192 that is remotely located from the first worksite 191. The workpieces 110/120 may be formed from metal materials, such as Titanium, Aluminum, etc., may be formed from composite materials, such as a Carbon Fiber Reinforced Polymer (CFRP), Carbon Fiber Reinforced Plastic (CRP), Carbon Fiber Reinforced Thermoplastic (CFRTP), etc., or may be formed from another type of material. The workpieces 110/120 may represent parts of an aircraft, an automobile, a watercraft, or some other machine being fabricated.

In step 502, the first drill plate 130, including first drill bushings (e.g., drill bushings 152) and first alignment pins installed to first template holes (e.g., template holes 132), is positioned with respect to a first pin setting device 170, wherein the first drill bushings and first alignment pins align in the first template holes to correspond with first holes (e.g., drill holes 112) in the first workpiece 110. As earlier described, the drill bushings 152 are configured to be installed to the first template holes in position with respect to the first template holes. The alignment pins are configured to be inserted through the drill bushings 152 to be held upright by the drill bushings 152 and centered thereto.

In step 504, the first pin setting device 170 positions a first reference member in a plane over the first drill plate 130 to first positions that align with centers of the first alignment pins. In step 506, the first pin setting device 170 captures coordinate data of the first positions. The coordinate data may be captured in response to centering the first reference member with the centers of the first alignment pins, and the coordinate data may include coordinate pair values corresponding with the centers of the first alignment pins.

In step 508, the coordinate data captured by the first pin setting device 170 is provided to the second pin setting device 180. The coordinate data representing locations of the first alignment pins in the template holes 132 may be saved/transferred via any suitable digital media (e.g., thumb drive, hard drive, server, network connections, etc.). In step 510, a second drill plate 140 is positioned with respect to the second pin setting device 180, the second drill plate 140 including second template holes that match the first template holes of the first drill plate 130. In step 512, the second pin setting device 180 positions a second reference member in a plane over the second drill plate 140 to second positions according to the coordinate data. Relative positions of the first pin setting device 170 and the first drill plate 130 correspond with relative positions of the second pin setting device 180 and the second drill plate 140. Thus, the hole pattern is advantageously transferred without the drill plates 130/140 being co-located.

In step 514, second drill bushings (e.g. drill bushings 162) are positioned in the second template holes (e.g., template holes 142) of the second drill plate 140 based on the seconds positions of the second reference member. The second drill bushings may be installed to the second template holes via second alignment pins (e.g., alignment pins 161) placed into alignment with the second reference member. In some embodiments, the second drill bushings are loosely installed to allow movement of the second drill bushings to correct pin locations, then the second drill bushings are tightened via threads to freeze the second drill bushings in their respective locations.

In step 516, the second drill plate, including the second drill bushings installed to the second template holes, is placed/positioned on the second workpiece 120. The second alignment pins may be removed from the second drill bushings to prepare for drilling. In step 518, the second workpiece 120 is drilled using the second drill bushings to guide the drilling to replicate the first holes in the first workpiece 110 as second holes (e.g., holes 122) in the second workpiece 120. Thus, the method 500 advantageously enables high tolerance hole pattern transfer for remotely located components.

Although specific embodiments were described herein, the scope is not limited to those specific embodiments. Rather, the scope is defined by the following claims and any equivalents thereof

What is claimed is:

1. An apparatus for replicating drill holes of a first workpiece at a first worksite on a second workpiece at a second worksite that is remotely located from the first workpiece at the first worksite, the apparatus comprising:
an interface configured to receive coordinate data of first alignment pins installed to first template holes of a first drill plate, the first alignment pins configured to adaptively align the first template holes of the first drill plate with first holes of the first workpiece;
a receptacle configured to receive a second drill plate having second template holes that match a pattern of the first templates holes of the first drill plate; and
a pin setting device configured to move a reference member in a plane over the receptacle and the second drill plate according to the coordinate data of the first alignment pins,
wherein when the reference member positions to coordinates in the coordinate data, the reference member indicates locations within the second template holes of the second drill plate to position drill bushings for replicating the first holes of the first workpiece on the second workpiece.

2. The apparatus of claim 1 wherein:
the reference member is an O-ring with an inner diameter sized to correspond with a width of second alignment pins, the second alignment pins configured to align the drill bushings in the second template holes of the second drill plate.

3. The apparatus of claim 2 further comprising:
one or more support members configured to suspend the O-ring over the receptacle, and to move the O-ring in the plane over the second drill plate according to the coordinate data.

4. The apparatus of claim 3 wherein:
a suspended height of the O-ring in the plane above a surface of the receptacle corresponds with a height of the second alignment pins above the surface of the receptacle.

5. The apparatus of claim 1 wherein:
when the drill bushings are installed in the locations of the second template holes as indicated by the reference member, the drill bushings are configured to guide a drill bit to replicate the pattern of the first holes of the first workpiece as a matching pattern of second holes in the second workpiece.

6. The apparatus of claim 1 wherein:
the pin setting device, the receptacle, and the second drill plate are positioned relative to one another such that the coordinate data of the first alignment pins points the reference member to lateral locations with respect the second template holes that replicate the first holes of the first workpiece.

7. The apparatus of claim 1 wherein:
the second workpiece is remotely located from the first workpiece.

8. A method of replicating drill holes of a first workpiece at a first worksite on a second workpiece at a second worksite that is remotely located from the first workpiece at the first worksite, the method comprising:
positioning a first drill plate, including first drill bushings and first alignment pins installed to first template holes of the first drill plate, with respect to a first pin setting device, wherein the first drill bushings and first alignment pins align in the first template holes to correspond with first holes in the first workpiece;
operating the first pin setting device to position a first reference member in a plane over the first drill plate to first positions that align with centers of the first alignment pins;
capturing coordinate data of the first positions;
providing the coordinate data of the first positions to a second pin setting device;
positioning a second drill plate with respect to the second pin setting device, the second drill plate including second template holes that match the first template holes of the first drill plate;
operating the second pin setting device to position a second reference member in a plane over the second drill plate to second positions according to the coordinate data;
positioning second drill bushings in the second template holes of the second drill plate based on the second positions of the second reference member;
positioning the second drill plate, including the second drill bushings installed to the second template holes, on the second workpiece; and
drilling holes in the second workpiece using the second drill bushings to guide the drilling to replicate the first holes in the first workpiece as second holes in the second workpiece.

9. The method of claim 8 further comprising:
capturing the coordinate data of the first positions in response to centering the first reference member with the centers of the first alignment pins.

10. The method of claim 8 further comprising:
securing the second drill bushings to the second template holes via second alignment pins placed into alignment with the second reference member.

11. The method of claim 8 wherein:
the coordinate data includes coordinate pair values corresponding with the centers of the first alignment pins.

12. The method of claim 8 wherein:
relative positions of the first pin setting device and the first drill plate correspond with relative positions of the second pin setting device and the second drill plate.

13. The method of claim 8 wherein:
the first workpiece, the first drill plate, and the first pin setting device are located at the first worksite, and
the second workpiece, the second drill plate, and the second pin setting device are located at the second worksite.

14. A system for replicating drill holes of a first workpiece at a first worksite on a second workpiece at a second worksite that is remotely located from the first workpiece at the first worksite, the system comprising:
a first drill plate including first drill bushings installed to first template holes of the first drill plate, the first drill bushings configured to receive first alignment pins sized to extend through the first drill bushings and into first holes of a first workpiece to align the first drill bushings within the first template holes, a first pin setting device including:
  a first receptacle configured to receive the first drill plate including the first drill bushings and the first alignment pins; and
  a first positioning system configured to translate a first ring in a plane over the first receptacle, to move the first ring to first positions that align with centers of the first alignment pins, and to capture coordinate data of the first alignment pins based on the first positions of the first ring;
a second drill plate including second template holes that match with the first template holes of the first drill plate;
a second pin setting device including:
  a second receptacle configured to receive the second drill plate; and
  a second positioning system configured to receive the coordinate data of the first alignment pins, to translate a second ring in a plane over the second receptacle, and to move the second ring to second positions according to the coordinate data, the second positions indicating locations of positioning second drill bushings in the second template holes of the second drill plate.

15. The system of claim 14 wherein:
when the second drill bushings are installed at the locations in the second template holes, the second drill plate is configured to replicate the first holes of the first workpiece as second holes in the second workpiece.

16. The system of claim 14 wherein:
the second positions indicate pin centering positions for aligning second alignment pins that position the second drill bushings at the locations in the second template holes.

17. The system of claim 14 wherein:
relative positions of the first pin setting device and the first drill plate correspond with relative positions of the second pin setting device and the second drill plate.

18. The system of claim 14 wherein:
the first drill bushings are configured to temporarily secure in position with respect to the first template holes, and
the second drill bushings are configured to temporarily secure in position with respect to the second template holes.

19. The system of claim 14 wherein:
the first template holes of the first drill plate are sized larger than the first holes of the first drill plate, and
the second template holes of the second drill plate are sized larger than the second template holes of the second drill plate.

20. The system of claim 14 wherein:
the first workpiece, the first drill plate, and the first pin setting device are located at the first worksite, and
a second workpiece, the second drill plate, and the second pin setting device are located at the second worksite.

* * * * *